March 26, 1935. A. L. NELSON 1,995,746
PISTON
Original Filed Feb. 7, 1923
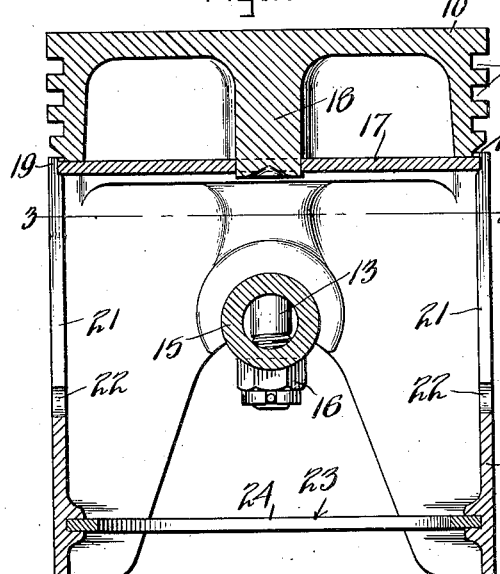
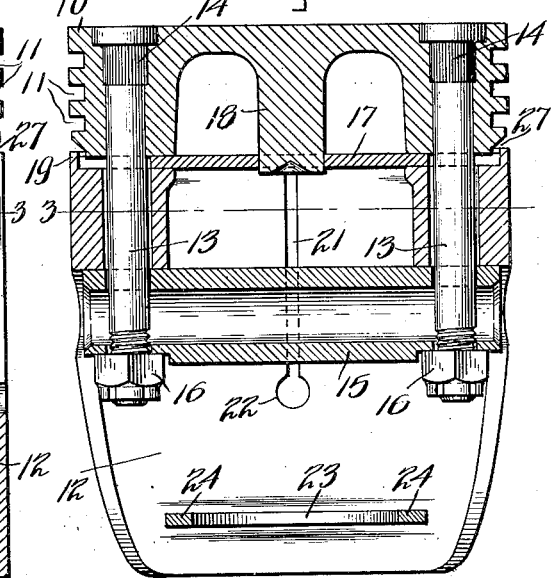
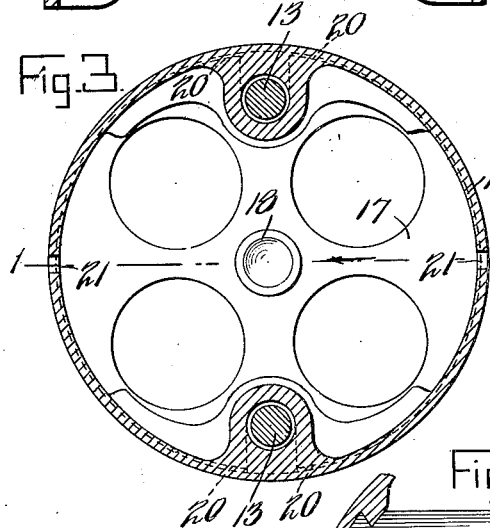
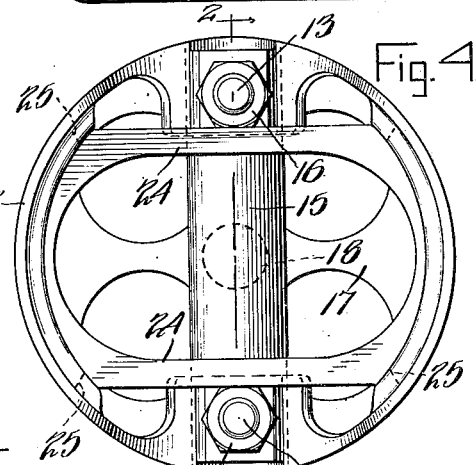
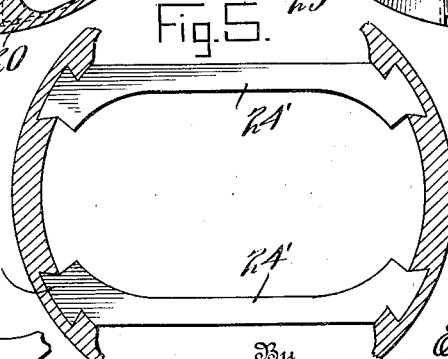
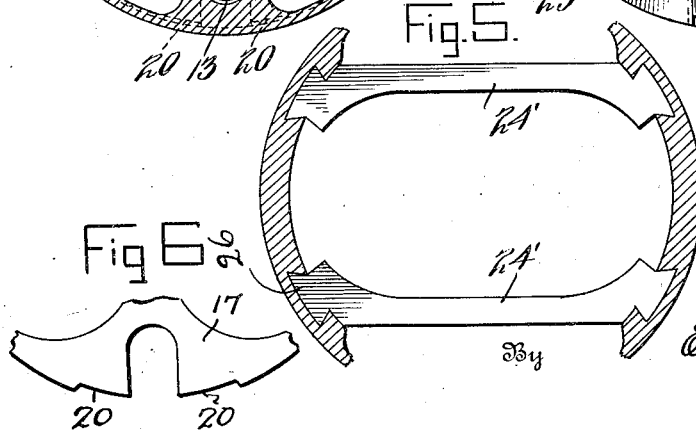
Inventor
Adolph L. Nelson
By
Attorney

Patented Mar. 26, 1935

1,995,746

UNITED STATES PATENT OFFICE

1,995,746

PISTON

Adolph L. Nelson, Indianapolis, Ind., assignor to Bohn Aluminum & Brass Corporation, Detroit, Mich.

Application February 7, 1923, Serial No. 617,585
Renewed September 8, 1932

12 Claims. (Cl. 309—15)

My said invention relates to piston construction and it is an object of the same to provide a piston in which the head shall be separate from the skirt and out of contact therewith, a strut being inserted between the head and the skirt.

A further object of my invention is to provide a piston construction in which the wear shall be reduced to a minimum. In the use of pistons and especially in internal combustion engines it is desirable that there be at all times a film of oil between the cylinder and the piston, at least at the lower end of the latter. If the distance between the piston and the cylinder wall is unduly increased at any time, as by reason of wear, this film is broken and friction results. The difference in diameter of the piston at different temperatures is one fruitful source of trouble in this respect. With a view to diminishing the contraction and expansion of the piston skirt I have provided a structure in which the skirt is separate (or substantially so) from the head and is provided with piston pin bearings open at the bottom, below which bearings the material of the skirt is also omitted in a manner to leave downwardly tapering tongues at the sides farthest from the piston pins. Midway between the sides of each tongue the skirt at its upper end is separated to a point below the piston pin bearings by a narrow cut terminating in a circular aperture.

At or adjacent the upper and lower ends of the skirt I have arranged struts which are made of steel or other material having a relatively low coefficient of expansion under heat, while the head and skirt may be of light aluminum alloy or any other material having wearing qualities as desired. The head may be of gray iron or like material if preferred to diminish ring wear in the grooves. The struts are preferably stamped out of sheet metal in the desired shape and are of such form and so located as to minimize the contraction of the piston skirt in cooling, this serving not only to maintain the diameter of the skirt and thus to maintain the oil film at all times, but also to prevent piston "slap" and "rattle". The pistons are substantially at their extreme diameter at all times and as the skirt cools off the material of the tongues being unable to contract diametrically will "crawl" or contract to a limited extent in a circumferential sense, i. e., the tongues become wider and narrower as the temperature changes. At the upper end the vertical slots also narrow or widen as the adjacent parts of the skirt become hotter or cooler.

Still another object of my invention is to provide means for accurately centering the parts of a piston made up of separable members. This may be done within the scope of my invention by casting the entire piston with the struts in place and subsequently separating the skirt from the head but in the present embodiment of the invention I have shown means for assembling the separate parts in correct relation.

Referring to the accompanying drawings, which are made a part hereof and on which similar reference characters indicate similar parts, Figure 1 is a section on line 1—1 of Figure 3, Figure 2, a section on line 2—2 of Figure 4, Figures 3 and 4, sections respectively on line 3—3 of Figures 1 and 2, the view in Figure 3 showing the structure looking up from the line, and Figure 4 looking downward, Figure 5 is a sectional view showing a modified form of the lower strut, and Figure 6, a fragment of the strut showing the relief.

In the drawings reference character 10 indicates the head of the piston having the usual grooves 11. A skirt 12 is attached to the head by means of bolts 13 which are knurled at their upper ends as indicated at 14 and have a driving fit in the piston head to hold them while the nuts 16 are turned up. These bolts extend downward through the head and the skirt and through openings in the stationary piston pin 15, being secured in place by the nuts 16 bearing against flattened surfaces on the piston pin which fits loosely in its bearings for easy assembling. By reason of this loose fit the pin does not distort the roundness of the skirt when assembled. A disk-shaped upper strut or plate 17, shown more particularly in Figure 3, is interposed between the head and the skirt which in the embodiment of invention here disclosed are out of contact with each other. The head is centered relatively to the strut by a central projection or boss 18 on the head fitting snugly in a central opening of the strut, the projection in this instance being solid. The skirt is centered relatively to the strut and the head by an upwardly projecting rim 19 fitting about the outer circumference of the strut. Obviously the head could be centered on the strut in like manner.

The strut which may consist of a steel stamping has radial openings at opposite sides to provide space for the bolts 13 and its circumference is relieved at 20 for a short distance on both sides of each bolt opening to provide for cylinders which may go out of round. This construction leaves the strut rigid in a direction transverse to the piston pin where contraction would normally be greatest. Expansion of the skirt at the bottom is provided for by cutting it away at each side beneath the piston pin so as to leave opposed tapering flanges at the lower end and by forming saw cuts at right angles to the piston pin at 21, these saw cuts extending from the holes 22 to the upper end of the skirt.

Near the bottom of the tapering flanges of the skirt of the piston is a second strut 23 which may be cast in place as indicated in Figure 4, this strut comprising parallel side members 24 extending transversely of the piston pin from flange to flange at a distance from the axis of the piston and connected to each other at their opposite ends. The end parts are cut away as indicated at 25 in a dovetail form so that the strut will be held securely in the lower end of the piston and will limit both its expansion and its retraction, the main object of this strut being to limit the contraction of the piston in cooling. It will be noted that this strut is rigid in the direction of the length of the parts 24, and that the upper strut affords a rigid support for the skirt of the piston in the direction of the arrow but permits the same to contract slightly in the opposite direction by reason of the relief at 20 without limiting the expansion.

In the modified form shown in Figure 5 the lower strut is formed of separate members 24' each having at its ends dovetailed portions 26 embedded in a flange of the piston these flanges as in the modification previously described having thickened parts near their lower extremities to receive the ends of the struts.

By reference to Figure 2 it will be seen that there is a passage leading from point 27 to the space surrounding the bolt 13 and then downward and outward through the piston pin which space forms a passage for oil scraped from the cylinder wall by the lower piston ring and entering the lower ring groove. As will be obvious the oil can enter the passage at 27 and run down around the bolt and through the radial opening and the central passage in the piston pin and so be returned to the engine casing. If desired a hole can be made through the skirt for this purpose so as to lead from said groove to the inside of the skirt. The main purpose, however, in providing a clearance about the bolts where they pass through the skirt and the piston pin is to leave room for changes in center distance.

Among the advantages of my device I may mention that the expansion of the piston head is independent of the skirt and that the upper strut partially insulates the skirt from the head, thereby limiting the heat transmitted to the skirt and so diminishing the expansion thereof. Furthermore, each of the struts is insulated to some extent from the adjacent parts because of the separate character of the parts.

While I have shown and described a specific embodiment of my invention it will be understood that various modifications thereof are possible within the scope of the invention and therefore I do not limit myself to what is shown in the drawings and described in the specification but only as indicated in the appended claims.

Having thus fully described my said invention, what I claim as new and desire to secure by Letters Patent, is:

1. In a piston, a head, a skirt separate therefrom, a stationary piston pin, and bolts passing through said parts for securing them together, the bolts fitting loosely in the skirt and the pin to provide an oil passage said passage leading to the outer circumference of the piston beneath the lowermost piston ring, substantially as set forth.

2. In a piston, a head, a separate skirt, bolts connecting said parts and fitting loosely in the skirt, a strut between the head and the skirt, said strut having openings extending inwardly from its circumference for said bolts, said openings and the clearance about said bolts providing oil passages through the skirt, substantially as set forth.

3. In a piston, a head, a skirt separate therefrom, a stationary piston pin, and bolts passing through said parts for securing them together, the bolts fitting loosely in the skirt and the pin, substantially as set forth.

4. In a piston, a head, a skirt separate therefrom, a strut interposed between the head and the skirt and fitting within the upper rim of the skirt, bolts passing through the head the strut and internal projections on the skirt to connect the parts the strut being cut away at opposite sides to accommodate the bolts and being relieved circumferentially adjacent to the cut-away portion, substantially as described.

5. A piston comprising a head and a skirt portion, the latter being longitudinally slit and formed of a light metal alloy, and means controlling the inherent tendency of such skirt portion to expand radially under an increase in temperature, said means comprising a member formed of a metal having a relatively lower coefficient of expansion than said skirt portion cast inside the latter so as to retain same in a condition of inwardly directed tension at working temperatures.

6. A piston comprising a head, a skirt, piston pin bosses, and a pair of struts separate from each other and located below the piston pin bosses and extending chordally of the skirt, each strut having an end anchored to the skirt by a cast-in joint.

7. A piston comprising a head, a skirt, piston pin bosses, the circumferential wall of the skirt being severed below each pin boss, and a pair of struts separate from each other, the struts extending chordally of the skirt below the pin bosses.

8. A piston comprising a head, a skirt, piston pin bosses, the circumferential wall of the skirt being severed below each pin boss, and a pair of struts separate from each other, the struts extending chordally of the skirt below the pin bosses and each strut having its ends secured to the skirt by a cast-in joint.

9. A piston comprising a head and skirt formed of light weight material, the skirt being formed with at least one opening extending upwardly from the lower end thereof, piston pin bosses, and a pair of struts of material less expansible than the material of the skirt, the struts being separate from each other and extending chordally of the skirt below the pin bosses.

10. A piston comprising a head and skirt formed of light weight material, the skirt being formed with at least one opening extending upwardly from the lower end thereof, piston pin bosses, and a pair of struts of material less expansible than the material of the skirt, the struts being separate from each other and extending chordally of the skirt below the pin bosses and each strut having its ends secured to the skirt by a cast-in joint.

11. A piston comprising a head and skirt formed of light weight material, piston pin bosses, the circumferential wall of the skirt being severed below each pin boss, and a pair of strut members of material less expansible than the material of the skirt, the strut members being separate from each other and extending chordally of the skirt below the pin bosses.

12. A piston comprising a head and skirt formed of light weight material, piston pin bosses, the circumferential wall of the skirt being severed below each pin boss, and a pair of strut members of material less expansible than the material of the skirt, the strut members being separate from each other and extending chordally of the skirt below the pin bosses and each strut member having its ends secured to the skirt by a cast-in joint.

ADOLPH L. NELSON.